United States Patent
Franchitti

(10) Patent No.: US 10,527,521 B2
(45) Date of Patent: Jan. 7, 2020

(54) RAILWAY CONDITION MONITORING SENSOR DEVICE AND METHOD FOR MONITORING THE CONDITION OF A RAILWAY BEARING

(71) Applicant: Aktiebolaget SKF, Gothenburg (SE)

(72) Inventor: Julian Franchitti, Erskine (GB)

(73) Assignee: AKTIEBOLAGET SKF, Gothenburg (SE)

( * ) Notice: Subject to any disclaimer, the term of this patent is extended or adjusted under 35 U.S.C. 154(b) by 351 days.

(21) Appl. No.: 15/353,282

(22) Filed: Nov. 16, 2016

(65) Prior Publication Data

US 2017/0199101 A1 Jul. 13, 2017

(30) Foreign Application Priority Data

Jan. 7, 2016 (GB) .................................. 1600280.0

(51) Int. Cl.
*G01M 13/04* (2019.01)
*B61K 9/00* (2006.01)
(Continued)

(52) U.S. Cl.
CPC ............ *G01M 13/045* (2013.01); *B61K 9/00* (2013.01); *B61L 15/0018* (2013.01);
(Continued)

(58) Field of Classification Search
CPC ............ G01M 13/045; B61L 15/0027; B61L 15/0081; B61L 15/0018; B61L 2205/04;
(Continued)

(56) References Cited

U.S. PATENT DOCUMENTS

2007/0208841 A1 9/2007 Barone et al.
2009/0001226 A1 1/2009 Haygood
(Continued)

FOREIGN PATENT DOCUMENTS

AU 2014280919 A1 1/2015
DE 202005005278 U1 5/2005
(Continued)

*Primary Examiner* — Anne M Antonucci
(74) *Attorney, Agent, or Firm* — Garcia-Zamor Intellectual Property Law, LLC; Ruy Garcia-Zamor; Bryan Peckjian

(57) ABSTRACT

The invention provides a railway condition monitoring sensor device attached to a railway bearing of a railway vehicle including at least one vibration sensor; means for detecting movement of the railway vehicle; a control unit for processing at least the signals obtained by the vibration sensor to determine a health parameter indicating the bearings state of health. The control unit triggers measurements based on at least one predetermined condition; and a wireless communication device for communicating the health parameter to a monitoring and control server. The control unit configured to be operated in an energy-saving sleep mode and in at an activated mode. The control unit is configured to switch from the sleep mode to the activated mode upon detecting that a predetermined set of conditions is met. The predetermined set of conditions includes the condition that the means for detecting the movement detects that the railway vehicle is moving.

9 Claims, 3 Drawing Sheets

(51) Int. Cl.
*B61L 15/00* (2006.01)
*B61L 25/02* (2006.01)
*G01M 13/045* (2019.01)
*B61F 15/02* (2006.01)

(52) U.S. Cl.
CPC ......... *B61L 15/0081* (2013.01); *B61L 25/025* (2013.01); *B61F 15/02* (2013.01); *B61L 2205/04* (2013.01)

(58) Field of Classification Search
CPC . B61L 25/025; B61K 9/04; B61K 9/00; B61F 15/02
See application file for complete search history.

(56) References Cited

U.S. PATENT DOCUMENTS

| | | |
|---|---|---|
| 2009/0216398 A1 | 8/2009 | Lynch et al. |
| 2011/0231039 A1* | 9/2011 | Leitel ................... B60T 8/1893 701/19 |
| 2014/0372498 A1 | 12/2014 | Mian et al. |
| 2015/0179003 A1 | 6/2015 | Cooper |
| 2016/0152255 A1* | 6/2016 | Cuthbertson ....... B60B 27/0068 701/19 |

FOREIGN PATENT DOCUMENTS

| | | |
|---|---|---|
| DE | 102010027490 A1 | 1/2012 |
| WO | 2013146428 A1 | 10/2013 |

* cited by examiner

RAILWAY CONDITION MONITORING SENSOR DEVICE AND METHOD FOR MONITORING THE CONDITION OF A RAILWAY BEARING

CROSS REFERENCE TO RELATED APPLICATIONS

This application claims priority to British patent application no. 1600280.0 filed on Jan. 7, 2016, the contents of which are fully incorporated herein by reference.

FIELD OF THE INVENTION

The invention relates to condition monitoring sensors used in vehicles to monitor axles or bearing units and to a method for monitoring a condition of a bearing or an axle. In particular, the invention relates to monitoring systems for train axles and/or bearings. A further aspect of the invention relates to the monitoring of railway track quality.

BACKGROUND OF THE INVENTION

It is known to attach condition monitoring units to a train axle or to a bearing thereof in order to monitor parameters such as vibration, temperature and acoustic emission.

Within the automotive sector, there are a plethora of wired sensors, many of which are associated with ECU (Engine Control Unit) and OBD (On Board Diagnostic) systems. These sensors are fully integrated into the vehicle's infrastructure such that during the vehicle's operation they have a continuous power supply. Data communications are supported by a CAN (Controller Area Network) bus. These sensor systems operate continuously to monitor their target parameters.

Locomotives and passenger carriages also have a range of sensor systems that are fully integrated, but these are generally related to safety critical functionality.

Currently available condition monitoring solutions with permanent power sources are configured to capture data continuously. However the captured data generally contain a large volume of artefacts and the measured curves reflect the curviness of the track, imperfections of the rails and other external influences. It is therefore necessary to use complex algorithms to filter the data to eliminate artefacts and to extract valuable and reliable information on the condition of the bearing from the large volume of data.

In order to save power and to ensure good data quality, it has been proposed to limit the measurement to specific sections of a track where low background noise and external factors are expected. To this end, it has been proposed to set predetermined waypoints triggering a measurement based on GPS data. If a certain waypoint along a track is reached, the control unit triggers a signal starting the condition monitoring units to measure the operating parameters of the bearings or other components being monitored and, likewise, the monitoring is stopped if the vehicle leaves the track.

To ensure consistent and reliable data readings, the condition monitoring unit should capture data on a known good quality section of track. Preferably, the track or route should be straight, level and allow the train to reach and maintain a constant speed. Additionally these waypoints are track trigger co-ordinates and function as reference points for data trending as all measurements will therefore be referenced to the same points on the track or route.

Energy consumption can be reduced significantly by powering on and logging data for short periods of time when the correct conditions are met. Triggering measurements on a known piece of track reduces data collection errors or anomalies and optimizes the power usage. The reduced energy consumption may enable using generators or power harvesting means with lower rated power or increase the longevity of batteries.

According to the prior art, these GPS-waypoints triggering the activation or deactivation of the sensor units or condition monitoring units are set manually in advance. This is burdensome and complicated and requires the involvement of skilled engineers having both knowledge of the geographical and technical details of the track and of the technology being monitored.

In applications where no network structure exists or where the condition monitoring unit has to be attached to rotating components, it has been proposed to use wireless nodes. A consideration in the design of wireless sensor systems is the time between maintenance which is frequently dictated by the life of their batteries. As a consequence, power management is an important factor in the design of wireless sensor systems because it has immediate impact on maintenance intervals.

In recent deployments, wireless sensors located on axle-boxes communicate back to an on-board system using a local wireless network system which is used to gather sensor data and transfer it remotely. The installation of local wireless network systems on a train may be complicated and the systems are susceptible to failure. Each of these systems has the drawback of having a single point of failure: the on-board system.

The document DE 202005005278 U1 discloses a sensor unit for monitoring the temperature of axlebox bearings of railway vehicles. The document DE 102010027490 A1 discloses a further monitoring system for railway vehicles including a mobile telecommunication device based on the GSM or the UMTS standards.

When using wireless communication devices exchanging data on a permanent basis, there is a significant permanent energy consumption reducing the battery life. In cases where the sensor unit includes power-harvesting circuits, these must be dimensioned so as to yield sufficient energy even for intervals where the train is standing still. The latter intervals are, however, difficult to predict and/or to control for the manufacturer of the sensor unit and any limitation of these intervals would impose additional burdens onto the user of the railway vehicle.

BRIEF SUMMARY OF THE INVENTION

The invention seeks to overcome the above problems of the prior art by providing a railway condition monitoring sensor device, a railway axlebox and a method for monitoring a railway bearing with reduced energy consumption and capable of being installed in an uncomplicated way.

The invention relates to a railway condition monitoring sensor device configured to be attached to a railway bearing of a railway vehicle including at least one vibration sensor, means for detecting a movement of the railway vehicle, a control unit and a wireless communication device for communicating a health parameter to a monitoring and control server.

The control unit is configured by software and hardware to process at least the signals obtained by the vibration sensor to determine a health parameter indicating the state of health of the bearing. Further, the control unit is configured to trigger measurements based on at least one predetermined condition.

It is proposed that the control unit is further configured to be operated in an energy-saving sleep mode and in at least one activated mode, wherein the control unit is configured to switch from the sleep mode to the activated mode upon detecting that a predetermined set of conditions is met, wherein the predetermined set of conditions includes the condition that the means for detecting the movement detects that the railway vehicle is moving.

In the context of the invention, "attached to a railway bearing" is to be understood in a broad sense. The device does not need to be attached directly to the bearing but in sufficiently direct mechanical and thermal contact to ensure a reliable measurement of the state of the bearing to detect bearing defects such as defects in one of the raceways of the bearings, in one of the rolling elements of the bearings or in the bearing cage and/or overheating due to insufficient or contaminated lubrication. In a preferred embodiment of the invention, the components of the railway condition monitoring sensor device are housed in a single and compact housing which is robust enough to be operated in the harsh environment of railway axles. In the most preferred embodiment of the invention, the device is configured to be attached to the axlebox or to an end plate of the axle with a single bolt. However, it is possible to use two or more modules including different components of the device, e.g. in order to enable the placement of the communication device in a module which can be suitably placed to avoid screening of the radio signals.

The bearing may be a bearing with rolling elements of any kind, including in particular cylindrical, conical or toroidal rollers in one or two rows.

In a preferred embodiment of the invention, the wireless communication device is a mobile telecommunication module. In the context of the invention, "mobile telecommunication module" means that the module communicates with terrestrial or satellite-based communication network nodes and may be a module according to any suitable standard. By integrating mobile network communication technology (GPRS/EDGE/HSPA) and GNSS positioning functionality into the sensor device, there is no need for wires or an on-board system and one sensor failing does not prohibit the function of any another sensor. This makes the system much quicker to build, test, install and commission. It also reduces the cost of the system significantly as the on-board components are removed. Furthermore, the sensors can be configured to report directly to a central control server or to external systems, as data can be transmitted using standard protocols such as the internet protocol.

The inventors further propose that the control unit is configured to classify the health parameter by comparing the health parameter with at least one threshold value and to immediately communicate the health parameter to the monitoring and control server only when the health parameter is equal to or larger than the at least one threshold value. The advantage is that the energy consuming communication activities are limited to cases where relevant information is to be conveyed, i.e. where the bearing is damaged or starts to degrade. As a result, the energy consumption can be further reduced.

In a preferred embodiment of the invention, the control unit is configured to classify the health parameter into at least three severity classes by comparing the health parameter with at least a lower and an upper threshold value. In that case, the control unit may be configured to perform a classification of Red-Amber-Green (RAG) type and to switch into the sleep mode when the value of the health parameter is equal to or lower than a lower threshold value (Green), to continue collecting data and determining the health parameter if the value of the health parameter is between the lower threshold value and an upper threshold value (Amber) and to immediately communicate the health parameter to the monitoring and control server when the health parameter is equal to or larger than the upper threshold value.

In a preferred embodiment of the invention, the means for detecting a movement of the railway vehicle is a 3-axis accelerometer. 3-axis accelerometers are used in mobile phones and are therefore mass-produced products available at high quality at a reasonable price in the market. The accelerometers can be operated in the sleep mode with extremely low energy consumption. Alternatively, the means for detecting a movement of the railway vehicle is the vibration sensor used for detecting a bearing condition, e.g. a piezo sensor or a fiber-based Bragg sensor attached in direct or very close contact to the bearing ring.

It is further proposed that the device includes a GNSS module for detection of a geographical location, wherein the control unit is configured to determine the health parameter if the geographical location is within a predetermined range. By using a GNSS receiver within the sensor, the main processor can gather positional information and determine the vehicle location and speed and in turn the speed of the rotating bearing and wheel. If the speed is constant a measurement may be taken. When the sensor device is awakened and needs to know its global location to establish if it should capture data, it can check its memory to see if a waypoint is nearby and trigger a measurement upon reaching it. The GNSS module can be used for a limited time to conserve energy. If no waypoints are in radius, the sensor can use the speed from the GNSS and readings from the 3-axis accelerometer to trigger where it determines it is going at a constant speed and the background vibration noise is suitably within limits.

To further maximize the chance of capturing data with minimal external noise, the inventors propose that the sensor device is equipped with on-board non-volatile memory such as FLASH which can store preprogrammed coordinates or 'waypoints' of long straight and smooth sections of track.

A further aspect of the invention relates to a railway axlebox including a condition monitoring sensor device as described above.

A yet further aspect of the invention relates to a railway condition monitoring system including at least one railway condition monitoring sensor device as described above and a monitoring and control server configured to receive and process messages including the health parameter of the bearing received from the wireless communication device, wherein monitoring and control server is configured to generate maintenance information relating to the bearing based on the health parameter.

Finally, the inventors propose a method for monitoring the condition of a railway bearing and/or of a railway track using a railway condition monitoring sensor device according to one of the preceding claims, wherein the control unit is operated in an energy-saving sleep mode and in at least one activated mode, wherein the control unit is switched from the sleep mode to the activated mode upon detecting that a predetermined set of conditions is met, wherein the predetermined set of conditions includes the condition that the railway vehicle is moving.

This invention solves problems by significantly reducing the cost and installation time of bearing condition-monitoring systems on rolling stock. In most deployments, bearing condition-monitoring systems require wiring to supply power and communications to an on-board data collector and to external sensors. Installing such a system takes a significant amount of time.

According to a preferred embodiment of the invention, no on-board components are required, i.e. no components mounted at a distance to the axlebox e.g. in a locomotive of the train.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE INVENTION

Figure 1:
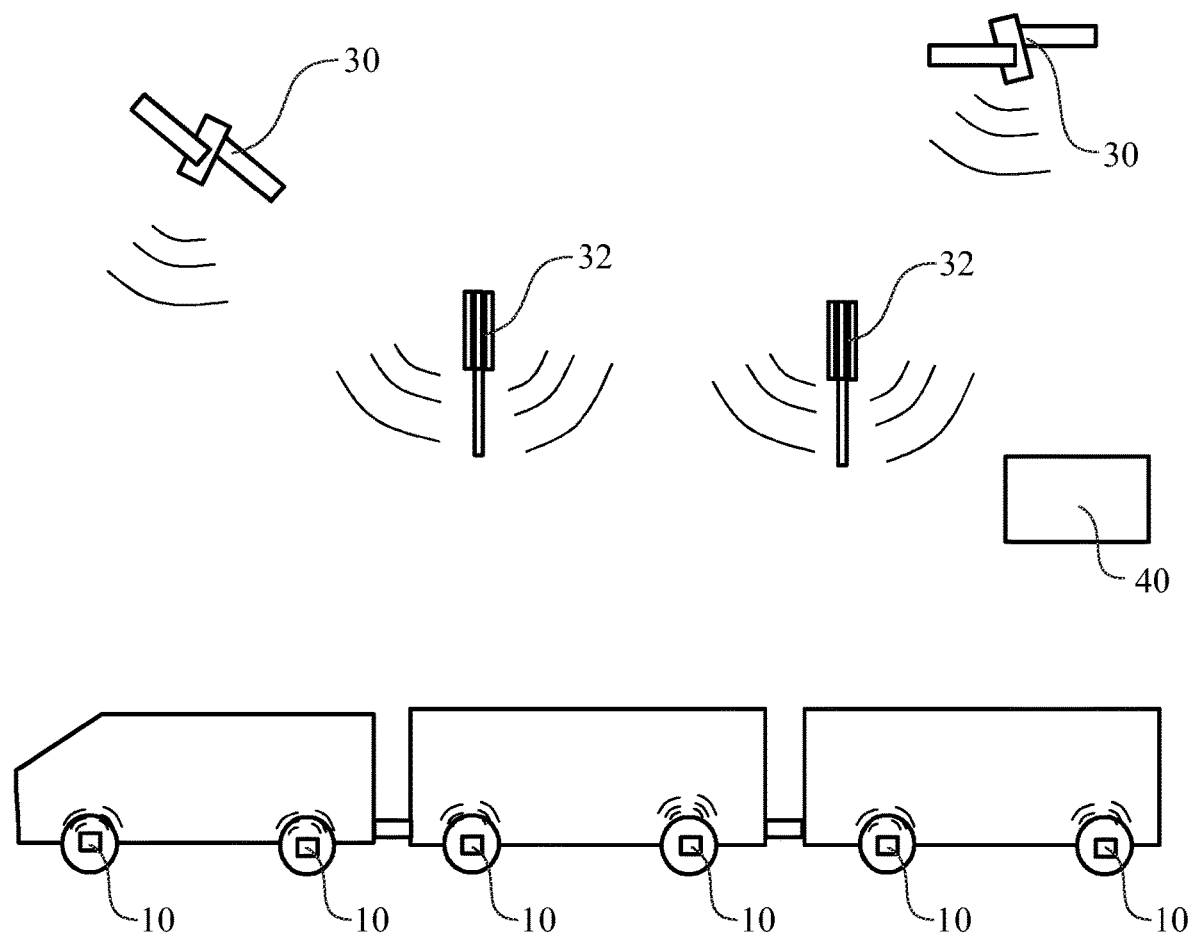
FIG. 1 is a schematic representation of a train equipped with a modular condition monitoring system.

FIG. 1 is a schematic representation of a train equipped with a modular condition monitoring system for bearing units for vehicles according to the invention. The system comprises multiple railway condition monitoring sensor devices 10—one for each wheel of the train—for measuring at least one operating parameter of one bearing unit of a train axlebox. The railway condition monitoring sensor devices 10 are formed as sensor nodes attached to or embedded into the end plate of a double row roller bearing assembly of the hub (not shown) or to an axlebox housing. The measured operating parameters include vibrations, acoustic emissions and temperature of the bearing and the railway condition monitoring sensor devices 10 include corresponding sensors 12 respectively.

Figure 2:
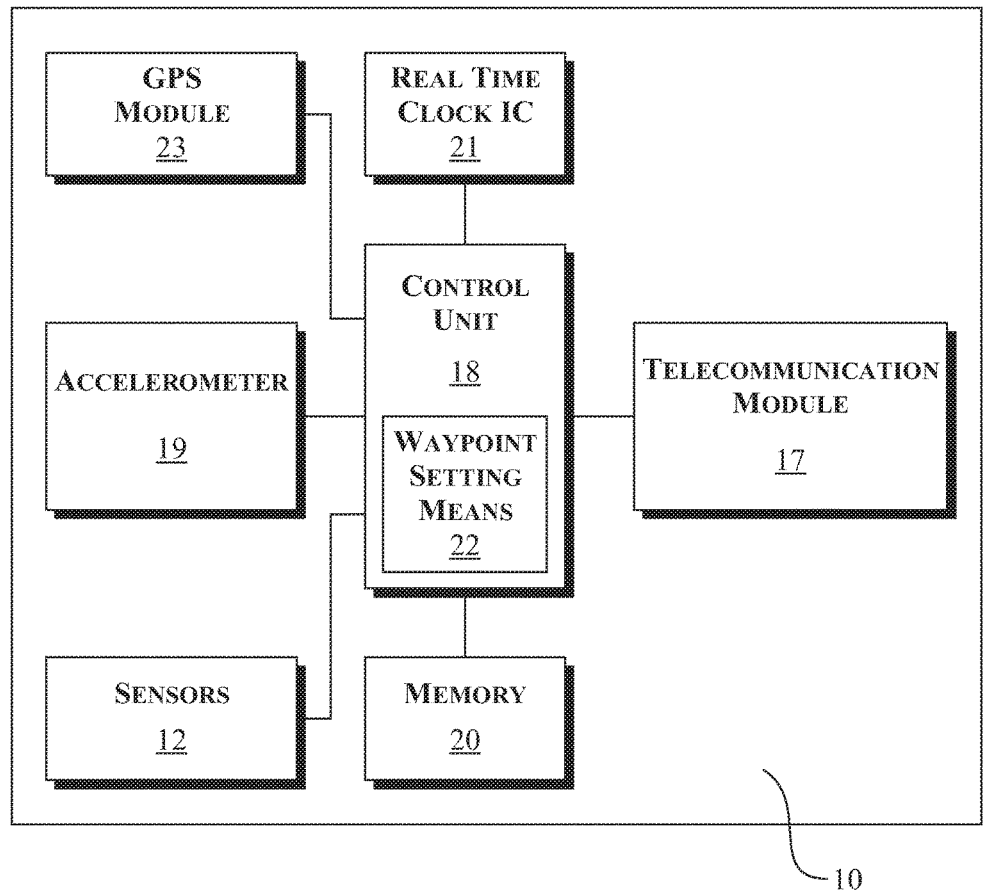
FIG. 2 is a block diagram of a railway condition monitoring sensor device according to the invention.

The system architecture of the individual sensor devices 10 is illustrated in FIG. 2. Each of the sensor devices includes a control unit 18 for operating the peripheral devices embedded in the sensor device 10 under consideration. These peripheral devices include in particular a vibration sensor 12 mounted in close mechanical contact to one of the bearing rings, a mobile telecommunication module 17 for receiving and transmitting data packets in a terrestrial mobile telecommunication network as a mobile communication interface using e.g. a GSM, GPRS, UMTS, or HSDPA standard, a 3-axis accelerometer IC 19 such as the accelerometer available from Freescale under the name MMA8451Q and an external real time clock IC 21 such as the NXP PCF2123. In other embodiments of the invention, the real time clock IC could be dispensed with and other means for determining the system time could be used. One example would be using a 32 bit counter to schedule measurements. Either of these devices can enable the generation of a wakeup signal of the control unit 18.

The telecommunication network includes base stations 32 provided within the range of the railway track. The telecommunication module 17 enables the exchange of data with a remote stationary monitoring and control server 40 of the system. The railway condition monitoring sensor devices 10 further include batteries or a power harvesting system powering the sensors 12, the control unit 18, the telecommunication module 17 and the remaining peripheral devices, if any.

An analog-to-digital converter may be integrated in the sensor 12 or provided between the sensor 12 and the control unit 18.

Last but not least, the control unit 18 comprises a GPS receiver 23 receiving positioning signals from a system of satellites 30 (FIG. 1) as means for detecting a geographic position. The system is configured such that the railway condition monitoring sensor devices 10 can be operated in a sleep mode or in an active mode. Within the active mode, the measurement and data logging can be activated and/or deactivated depending on the detected geographic position as further explained below.

When the vehicle is moving and therefore the bearings are rotating the sensor must decide when to take measurements. This process is critical as it is understood that taking measurements upon rough sections of track, at low speeds, at very high speeds, round corners or when the vehicle is accelerating or decelerating produce noise and it is not possible to determine the bearing or wheel condition. Taking multiple measurements and choosing the lowest noise is an option however this wastes energy as all may have been taken in unsuitable conditions. Further to this in order to perform condition monitoring, an accurate speed of the bearings is required. As these sensors are bolted on externally to the axlebox, they must gather the speed from the global position of the vehicle.

The control unit 18 is equipped with a memory 20 for storing route data of the vehicle as well as other data including sensor data captured by the sensors 12. In the embodiment where the vehicle is a train, the route data is a map of a railway network. In other embodiments, the route data may be a collection or a database of waypoints or a network made up of nodes and links. The railway network is composed of a plurality of sections or links stored in the database in the memory 20 in combination with parameters describing properties of the section such as a slope, average curvature, and maximum allowable travelling speed. The database in the memory 20 includes a plurality of possible route sections along which the vehicle can travel.

A waypoint setting means 22 of the control unit 18 is configured to set waypoints for activating the railway condition monitoring sensor devices 10 with the sensors 12 in suitable sections of the track. Deactivation waypoints can be set by the waypoint setting means 22 as well.

The waypoint setting means 22 can be part of the control unit 18 or of a remote server sending the waypoints to the control unit 18 using the mobile communication interface.

Each of the waypoints is a data structure comprising not only the GPS coordinates but a further optional field indicating the travelling direction of the train in which the monitoring shall be triggered. Further, the data structure may comprise fields for upper and lower speed limits and, in one embodiment of the invention, for a radius, i.e. a minimum distance to the GPS coordinates required to trigger the waypoint alarm. Accordingly, the system can be configured such that the alarm is not triggered every time the train passes the waypoint but rather only when the train passes in one of the two possible directions on a track and when the speed is in a desired range suitable for obtaining measurements of high quality.

In the embodiment of the figures, the waypoint setting means 22 is an application for planning the data collection waypoints on the train's route. These may in particular include actual co-ordinates on a straight path where the speed is known to be constant. The waypoint setting means 22 in the embodiment provides a KML (Keyhole Markup Language) file or other kind of standard file format (e.g. GML) which is a standard for GIS data used by various map providers. This generic file can be used by a server of the condition monitoring system to download and use the waypoints or waypoints, which are stored in a waypoint database in the memory 20.

The waypoints are candidates for starting points and endpoints of route sections which are part of a set of predetermined route sections in which the data acquisition by the railway condition monitoring sensor devices 10 shall be activated.

Figure 3:
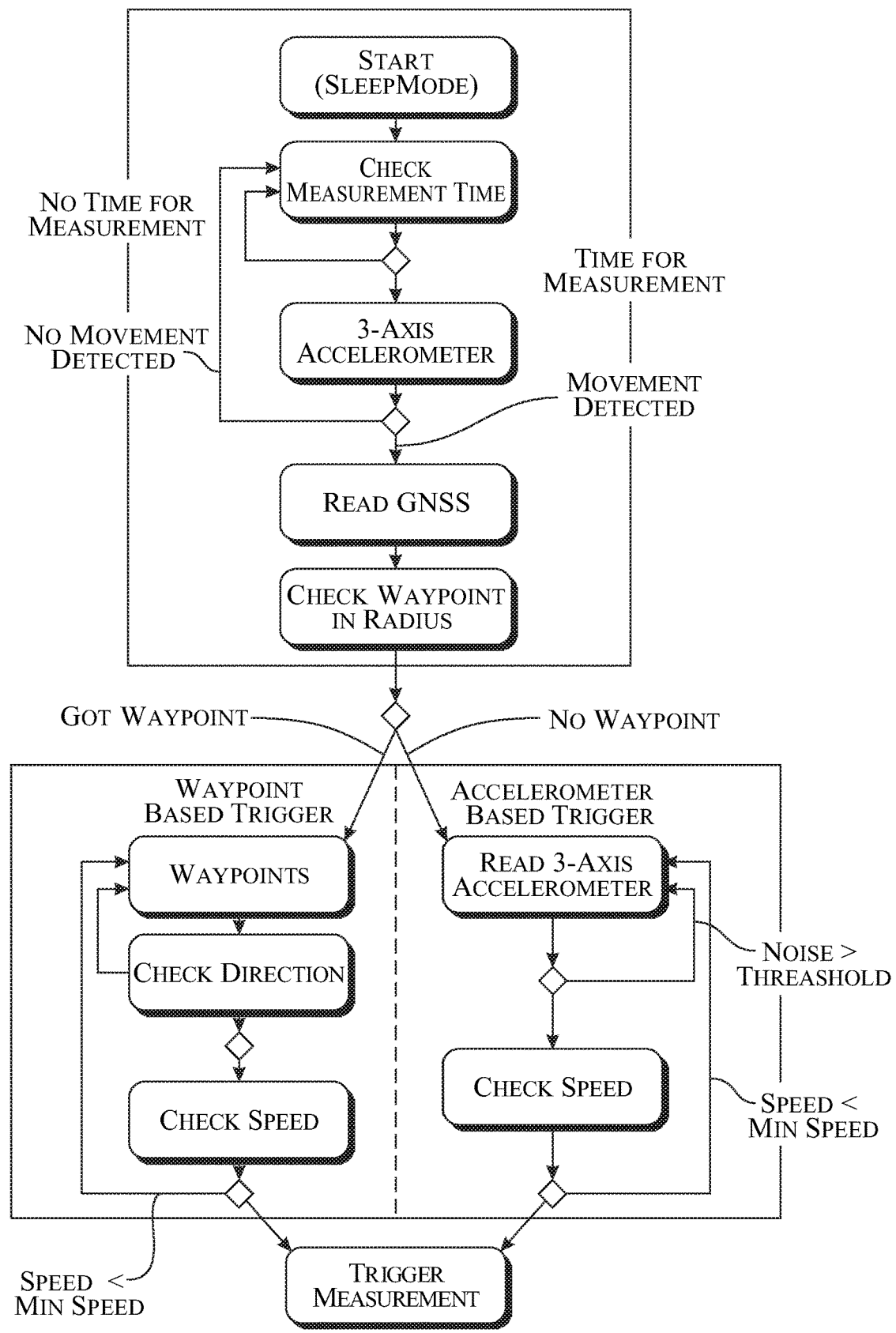
FIG. 3 is a flow chart of a condition monitoring method according to the invention.

The triggering of the sensor measurements by the control unit 18 is illustrated in FIG. 3. The measurement is started only when a first block of time- and movement-based triggering conditions and a second block of waypoint triggering or accelerometer based triggering conditions is cumulatively met.

On start, the control unit is operated in a low-energy sleep mode where only the system time provided by the external real-time clock IC 21 is being monitored. When the system time indicates that a predetermined interval has passed, the control unit 18 reads the signals of the accelerometer 19 to detect whether or not the train is moving. Movement is detected by applying a threshold on a peak hold envelope signal of the accelerometer 19. Hence, the accelerometer 19 serves as a means for detecting a movement of the railway vehicle.

The system times set for reading the accelerometer 19 need not be in regular intervals but may be set otherwise, e.g. to match a daily schedule of the train.

If the control unit 18 finds that the train is running, it switches to the active measurement mode by sending a wakeup signal to its peripheral devices and starts evaluating the waypoint-based triggering conditions.

Upon receiving the activation signal, the GPS receiver 23 listens and interprets messages for Position, Speed, and Direction encoded according to the standards set by the national marine electronics association (NMEA). Then, the in-memory waypoint database with the collection of waypoints in the memory 20 is updated using the data received from the waypoint setting means 22. Based on the position, the GPS system determines a waypoint arrival for each of the provided waypoints and notifies the control unit 18 when the waypoint is reached.

If there are any waypoints within the search radius, the direction variable stored in relation to each of them is checked match the direction of the vehicle. If the direction is matched, the speed is checked in a subsequent step. When the speed is greater than or equal to the pre-configured value (Min speed), the measurement is triggered.

In embodiments where a radius specific to a waypoint is set, the latter should be set smaller than the search radius and the waypoint alarm should be triggered only when the distance to the waypoint is within both the search radius and the waypoint-specific radius. Once a measurement has been triggered, the waypoint is marked as processed in the waypoint database.

If there are no waypoints within the search radius, the noise in the signal of the accelerometer 19 is compared with a threshold value. If the noise is low enough to expect high-quality measurements, the speed is checked. When the speed is greater than or equal to the pre-configured value, the measurement is equally triggered.

An alternative method of triggering measurements is facilitated by the system where a precise network time is specified for the measurement commencement time. The system application software monitors positional data which is constantly provided by the GPS module 23 and estimates the time it will take to reach the waypoint location. At a time prior to reaching the waypoint, the system application software sets a system time for measurement in the future. When this time is reached, the process of FIG. 3 by reading out the accelerometer as described above.

The activation and deactivation may further be dependent on other parameters such as travelling speed, outside temperature and elapsed time since the last activation. As an optional feature, speed changes are constantly reported by the GPS module 23 and if the speed changed event is handled the database is updated accordingly.

As already mentioned, condition monitoring unit 10 for use in the condition monitoring system as described above includes a control unit 18 configured to operate in an energy saving sleep mode and in an active mode. The control unit 18 is configured to switch the condition monitoring unit 10 from the sleep mode to the active mode and from the active mode into the sleep mode based on signals received by the control unit 18 via the transmitter 16 from the control unit 18. More specifically, the control unit 18 is configured to switch the condition monitoring unit 10 from the sleep mode to the active mode upon receipt of a wake-up signal from a control unit 18 and to switch the condition monitoring unit 10 from the active mode into the sleep mode upon receipt of a sleep signal from the control unit 18. The sleep signal is usually generated upon completion of the measurement.

In further embodiments of the invention, the condition monitoring system may include an INS (Inertial Navigation System).

Once the data has been captured, the control unit 18 can perform an internal algorithm to determine a severity of bearing damage health parameter of the bearing as a parameter indicating the condition of the part it is monitoring. If the severity is deemed low (green) the sensor device 10 can go back to sleep, if the severity is medium (amber) it may decide to store the data until further measurements have been gathered or transmit the status. If the severity is severe (red) the sensor device 10 can immediately transmit the data severity parameter or the health parameter provided a cellular network connection is present. Using this method of data offload, the sensor device 10 transmits data infrequently saving power and data cost. The power saving can equate to cost saving as the sensor requires very little maintenance and can operate from an internal battery supply over a period of years.

Upon receipt of the data measured by the sensor device from the wireless communication device, the monitoring and control server 40 processes the messages including the health parameter of the bearing and generates or adapts maintenance information such as a maintenance plan relating to the bearing based on the health parameter. If damage is detected, the next maintenance service can be scheduled earlier or it may be noted that the bearing needs to be replaced in the maintenance plan, depending on the severity. The data packets received by the control server 40 include at least a bearing identifier, a severity parameter and geographical information indicating where the problem has been detected.

The cost of the system is reduced by incorporating the features of an on-board system into the sensor, making it more attractive to prospective customers.

Manufacturing time and costs are reduced as the system consisting of sensors and costly on-board components such as gateways and PCs can now be condensed into a single smart sensor device 10.

The invention claimed is:

1. A railway condition monitoring sensor device configured to be attached to a railway bearing of a railway vehicle comprising:
   at least one vibration sensor;
   means for detecting a movement of the railway vehicle along a direction of travel;
   a control unit for processing at least the signals obtained by the vibration sensor to determine a health parameter indicating the state of health of the bearing, wherein the control unit is configured to trigger measurements based on at least one predetermined condition; and
   a wireless communication device for communicating the health parameter to a monitoring and control server,
   wherein the control unit is configured to be operated in an energy-saving sleep mode and in at least one activated mode,
   wherein the control unit is configured to switch from the sleep mode to the at least one activated mode upon detecting that a predetermined set of conditions is met, and
   wherein the predetermined set of conditions includes the condition that the means for detecting the movement detects that the railway vehicle is moving along a direction of travel.

2. The railway condition monitoring sensor device according to claim 1, wherein the wireless communication device is a mobile telecommunication module.

3. The railway condition monitoring sensor device according to claim 2, wherein the control unit is configured to classify the health parameter by comparing the health parameter with at least one threshold value and to immediately communicate the health parameter to the monitoring and control server only when the health parameter is equal or larger than the at least one threshold value.

4. The railway condition monitoring sensor device according to claim 3, wherein the control unit is configured to classify the health parameter into at least three severity classes by comparing the health parameter with at least a lower and an upper threshold value and to:
   switch into the sleep mode when the value of the health parameter is equal to or lower than a lower threshold value;
   continue collecting data and determining the health parameter if the value of the health parameter is between the lower threshold value and an upper threshold value and to;
   immediately communicate the health parameter to the monitoring and control server when the health parameter is equal to or larger than the at least one threshold value.

5. The railway condition monitoring sensor device according to claim 4, wherein the means for detecting a movement of the railway vehicle is the vibration sensor.

6. The railway condition monitoring sensor device according to claim 1, wherein the means for detecting a movement of the railway vehicle is a 3-axis accelerometer.

7. The railway condition monitoring sensor device according claim 1, further comprising a GNSS module for detection of a geographical location, wherein the control unit is configured to determine the health parameter if the geographical location is within a predetermined range.

8. A railway condition monitoring system comprising:
   at least one railway condition monitoring sensor device having;
      at least one vibration sensor;
      means for detecting a movement of the railway vehicle along a direction of travel;
      a control unit for processing at least the signals obtained by the vibration sensor to determine a health parameter indicating the state of health of the bearing, wherein the control unit is configured to trigger measurements based on at least one predetermined condition; and
      a wireless communication device for communicating the health parameter to a monitoring and control server,
      wherein the control unit is configured to be operated in an energy-saving sleep mode and in at least one activated mode,
      wherein the control unit is configured to switch from the sleep mode to the at least one activated mode upon detecting that a predetermined set of conditions is met, and
      wherein the predetermined set of conditions includes the condition that the means for detecting the movement detects that the railway vehicle is moving along a direction of travel, and
   a monitoring and control server configured to receive and process messages including the health parameter of the bearing received from the wireless communication device,
   wherein the monitoring and control server is configured to generate maintenance information relating to the bearing based on the health parameter.

9. A method for monitoring the condition of a railway bearing and/or of a railway track using a railway condition monitoring sensor device comprising:
   providing at least one vibration sensor, a means for detecting a movement of the railway vehicle along a direction of travel, a control unit for processing at least the signals obtained by the vibration sensor to determine a health parameter indicating the state of health of the bearing, wherein the control unit is configured to trigger measurements based on at least one predetermined condition, and a wireless communication device for communicating the health parameter to a monitoring and control server, wherein the control unit is configured to be operated in an energy-saving sleep mode and in at least one activated mode, wherein the control unit is configured to switch from the sleep mode to the activated mode upon detecting that a predetermined set of conditions is met, and wherein the predetermined set of conditions includes the condition that the means for detecting the movement detects that the railway vehicle is moving along a direction of travel,
   operating the control unit in an energy-saving sleep mode and in at least one activated mode,
   wherein switching the control unit from the sleep mode to the at least one activated mode upon detecting that a predetermined set of conditions is met, and
   wherein the predetermined set of conditions includes the condition that the railway vehicle is moving along a direction of travel.

* * * * *